INVENTOR.
BY Edward Sokolik

April 1, 1958     E. SOKOLIK     2,828,678
RESILIENT MOUNTING FOR A GROUND WORKING IMPLEMENT
Filed May 11, 1954     6 Sheets-Sheet 2

INVENTOR.
BY
Edward Sokolik

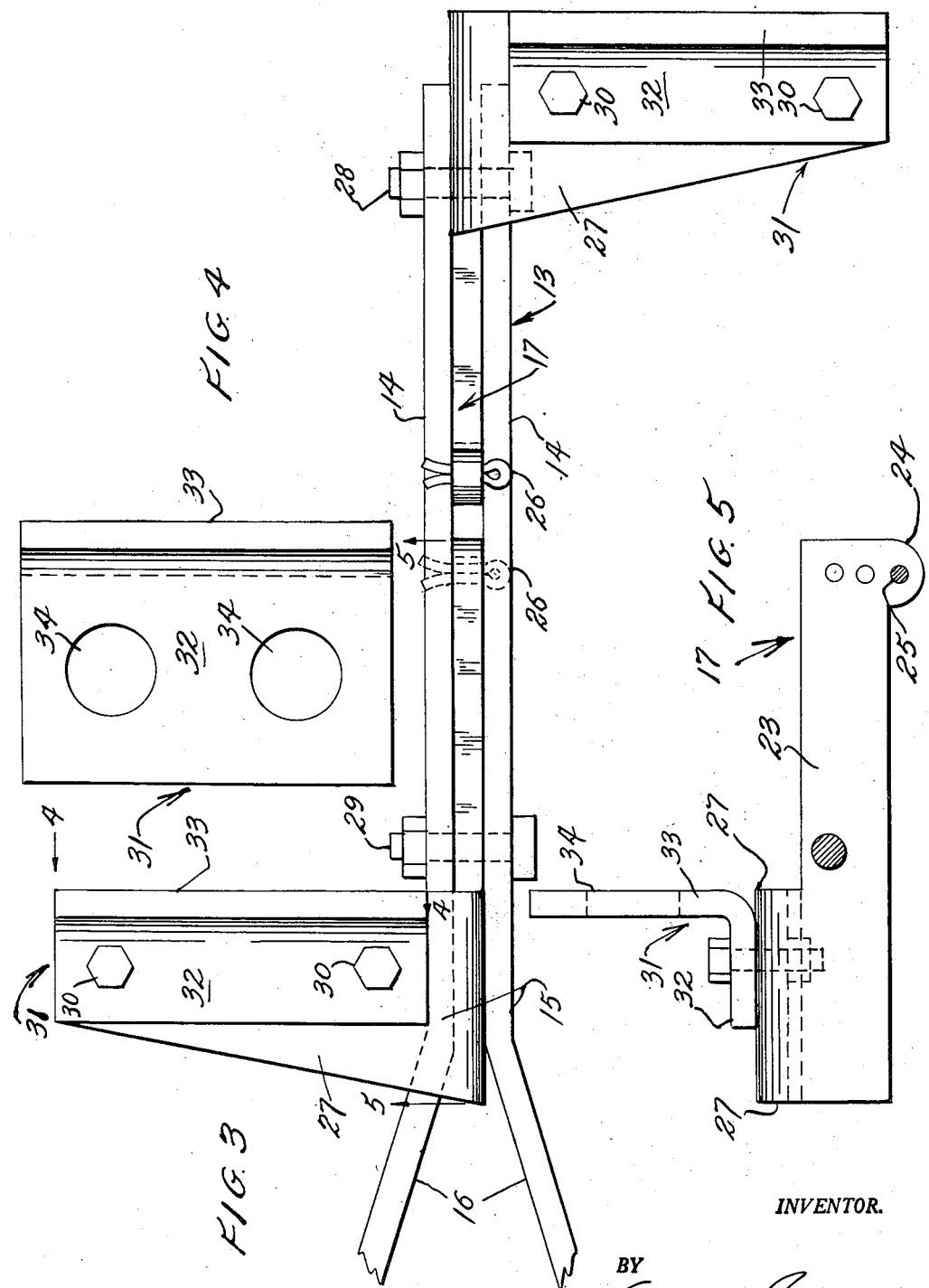

April 1, 1958      E. SOKOLIK      2,828,678
RESILIENT MOUNTING FOR A GROUND WORKING IMPLEMENT
Filed May 11, 1954      6 Sheets-Sheet 4
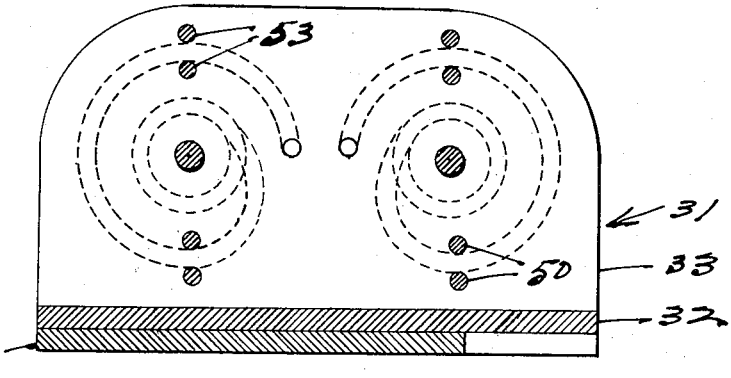
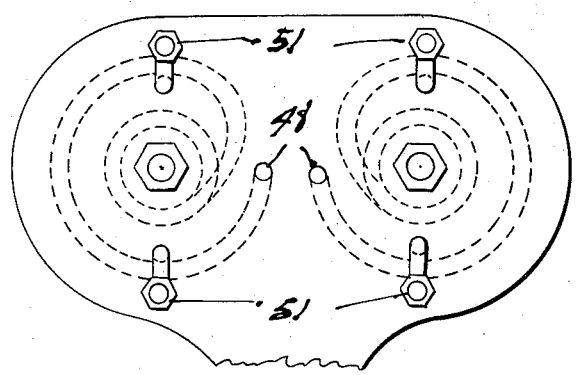
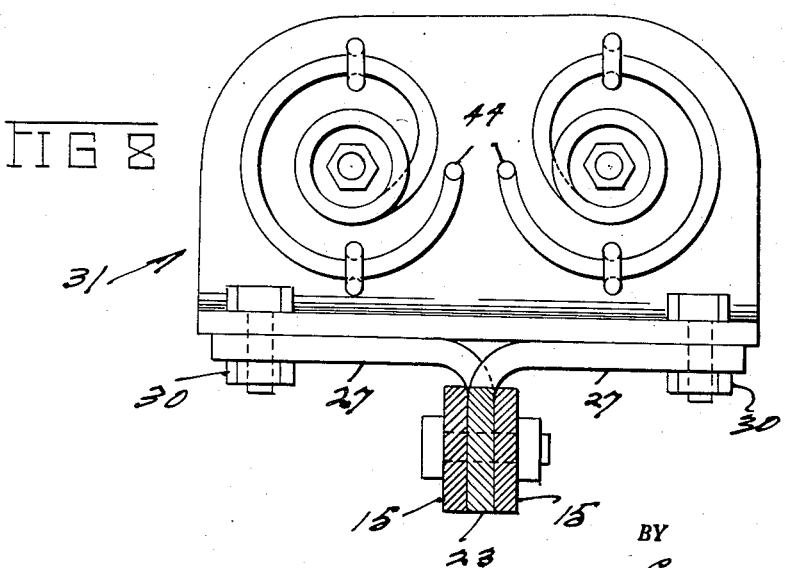
INVENTOR.
BY
Edward Sokolik

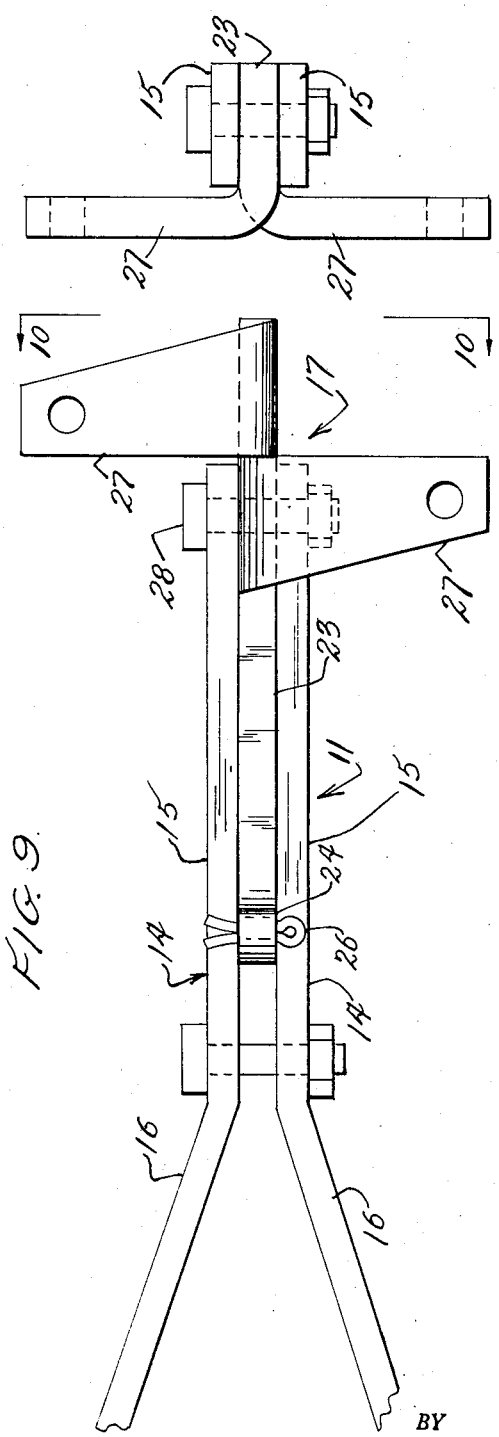

April 1, 1958  E. SOKOLIK  2,828,678
RESILIENT MOUNTING FOR A GROUND WORKING IMPLEMENT
Filed May 11, 1954  6 Sheets-Sheet 6

INVENTOR.
Edward Sokolik
BY
*Edward Sokolik*

United States Patent Office 2,828,678
Patented Apr. 1, 1958

2,828,678

RESILIENT MOUNTING FOR A GROUND WORKING IMPLEMENT

Edward Sokolik, New Brighton, Minn.

Application May 11, 1954, Serial No. 428,873

21 Claims. (Cl. 97—47.81)

My invention relates to a resilient mounting for a ground engaging implement.

An important object of the invention is to provide a resilient mounting which will normally hold the ground engaging element facing in the proper direction for performing its work.

A further object of the invention is to provide a mounting of the above mentioned character, which will permit of the free vibration of the ground engaging implement, in a direction longitudinally of the travel of the machine, to free the ground engaging implement from debris, earth, clay, or other material.

A further object of the invention is to provide a resilient mounting which is yieldable laterally to permit the ground engaging implement to be properly deflected from a stone or other fixed obstruction.

A further object of the invention is to provide a device of the above-mentioned character which is relatively simple in construction, cheap to manufacture and adjustable to regulate the tension of the springs.

Other objects and advantages of the invention will be apparent during the course of the following description.

In the accompanying drawings forming a part of this application and in which like numerals designate like parts throughout same, Figure 1 is a plan view of a resilient mounting of my invention.

Figure 3 is a plan view of a beam carrying two brackets, each having a support plate extending in opposite lateral directions.

Figure 4 is a view of the attaching plate on line as indicated by arrows 4—4, Figure 3.

Figure 5 is a side view of the bracket with the attaching plate on line 5—5, Figure 3.

Figure 6 is a view indicated by arrows 6—6, Figure 1.

Figure 7 is a view indicated by arrows 7—7, Figure 1.

Figure 8 is a view indicated by arrows 8—8, Figure 1.

Figure 9 is a plan view of a beam carrying one bracket at the rear end thereof.

Figure 10 is an end view indicated on line 10—10 of the bracket carried by the beam in Figure 9.

Figure 1:
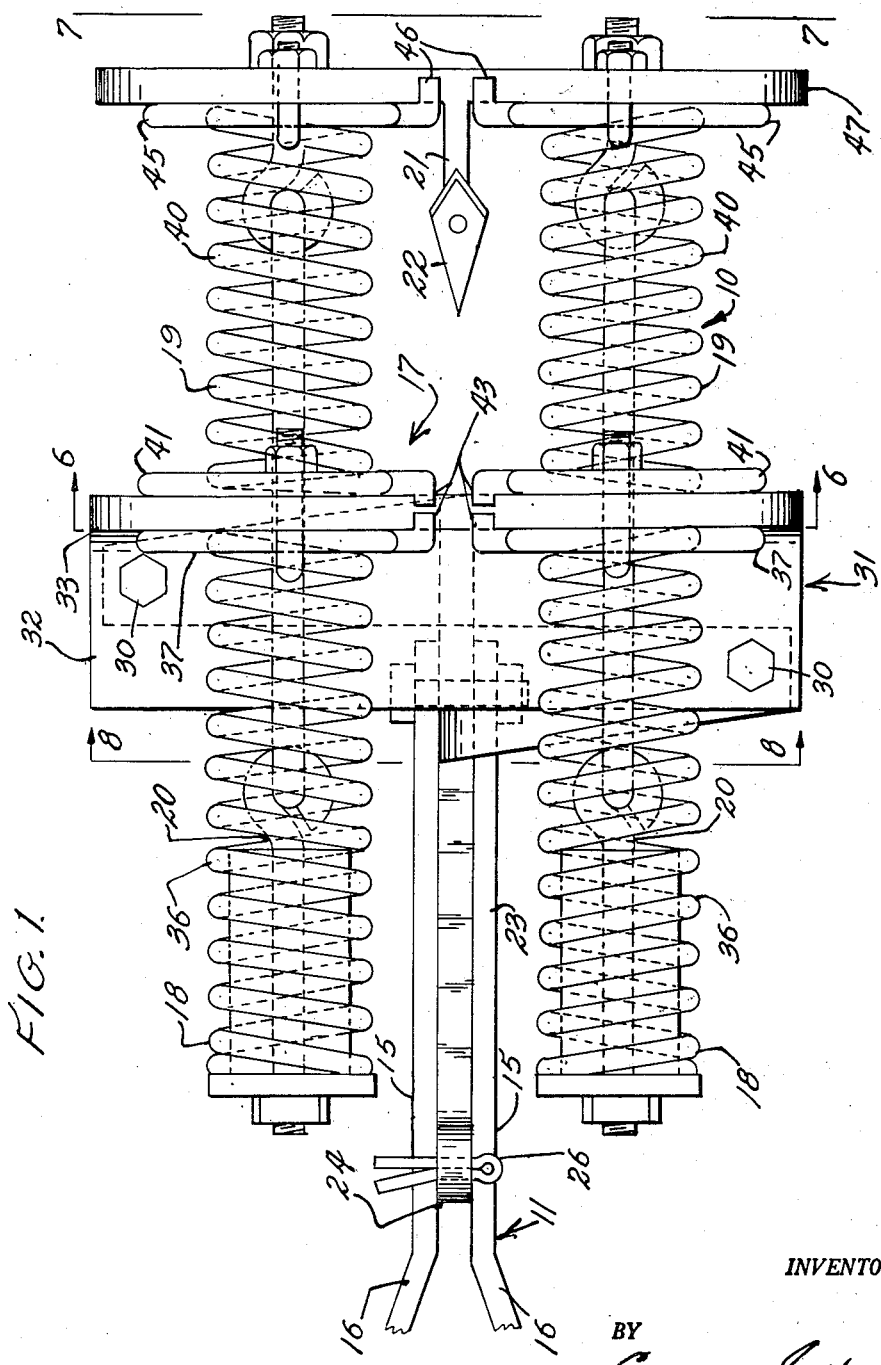

In the drawings for the purpose of illustration, is shown a preferred embodiment of my invention. It comprises in a wheeled implement Fig. 11 having a plurality of laterally arranged alternating short and long beams which are pivotally connected to a transversely disposed support bar, substantially as illustrated at 29 in Fig. 11, of the frame of the wheeled implement and which are raised or lowered by any conventional means, and held at the desired elevation by the raising and lowering means 36, which includes resilient pressure parts 12 to permit, within limits, upright yielding of the beams 11 and 13, a plurality of resilient mountings 10 arranged by the brackets 33, Fig. 3, preferably one for every short beam 11, and preferably a pair of resilient mountings 10, Fig. 1, for every long beam 13. Each of the beams 11 and 13 comprises a pair of longitudinal bars 14 which include parallel and spaced apart portions 15 and forwardly diverging portions 16 normally pivotally connected to the transverse bar support of the frame of the wheeled implement, such as a cultivator or a harrow.

The resilient mountings 10, Fig. 1, are affixed to the rear ends of the short beams 11 and to each of the beams 13 on opposite sides thereof, one at one side of the rear end thereof and the other arranged forwardly on the other side, as shown in Fig. 3. Each of the mountings 10 includes a bracket 17, two pairs of axially aligned coil springs 18 and 19 arranged laterally side by side, a flexible connecting device 20, a stock 21, and a ground working implement 22.

The bracket 17 of the rear mounting 10, Fig. 3, includes an arm 23 extending forwardly between the portions 15. This arm 23 has at the forward end thereof an upright extension 24 in which are uprightly spaced preferably three bores 25 for a cotter-pin 26, whereby the pitch of the arm 23 is adjustable. The arm 23' of the forward bracket 17' extends, as shown, rearwardly between the portions 15 and has at the rear end thereof a downward extension 24' in which are uprightly spaced preferably three bores 25' for a cotter-pin 26'. These cotter-pins 26 and 26' are inserted in the bores 25 and 25' to designate the depth of cultivation desired and bear against the top and bottom edges of the portions 15, respectively.

Each arm 23 and 23' of each bracket 17 and 17' has a support plate 27 and 27' extending generally horizontally over each portion 15 in opposite direction, and is secured to the portions 15, the arm 23 of the rear bracket 17 at the rear end thereof by bolt 28 and the arm 23' of the forward bracket 17' at the forward end thereof by bolt 28'.

Bolted by bolts 30 and 30' to each support plate 27 and 27' of each arm 23 and 23' is a right-angular attaching plate 31 and 31' each of which includes a horizontal plate 32 and 32' and an upright base-plate 33 and 33' each of which has a pair of lateral large openings 34 and 34' and a plurality of small bores 35 and 35' encircling each large opening 34 and 34'.

In Fig. 1, the bracket 17 of each short beam 11 includes a pair of support plates 27 at the rear end thereof, one plate on each side of the arm 23.

The arm 23 of the bracket 17 is bolted by bolt 28 generally between the rear ends of the portions 15 and has the extensions 24 extended upwardly and likewise provided with the bores 25 and cotter-pins 26. The support plates 27 likewise carry attaching plate 31 bolted thereon by bolts 30 in a manner so that if the attaching plate 31 has two lateral openings 34, the centre-line therebetween is in line with the centre-line of the beam 11.

Figure 2:
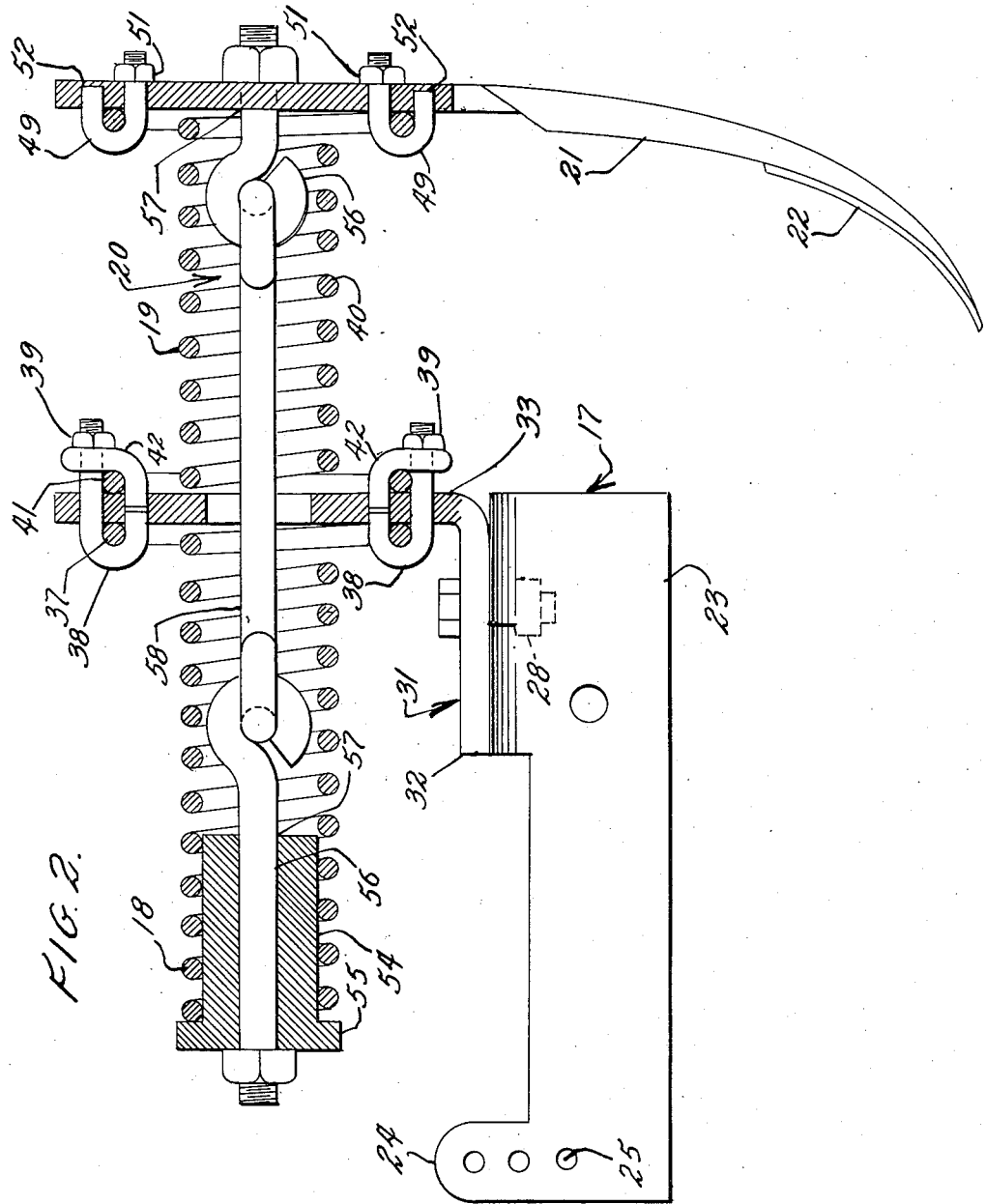
Figure 2 is a view partly in vertical section on line 2—2 Fig. 1.

Arranged forwardly of the base-plate 33 is a pair of coil springs 18 disposed side by side and each having enlarged terminal turn or coil 37 at its rear end. The enlarged terminal coils 37 are held by J-bolts 38 and are clamped thereby to the base-plate 33. These J-bolts 38 extend through the bores 35 formed in the base-plate 33 of the forward attaching plate 31, and the U-ends thereof are anchored in the bores 35'. The screw threaded shanks of the J-bolts are provided with nuts 39, as shown in Fig. 2. The ends of the enlarged coils 37 may be formed into anchor lugs 43 anchored in bores 44.

Arranged rearwardly of the base-plate 33, is a pair of coil springs 19 disposed side by side and provided at their forward ends with enlarged terminal coils 41 contacting the base-plate 33. These terminal coils 41 are held by right-angled eye-lugs 42, Fig. 2. The eye ends of these lugs 42 are mounted upon the screw threaded shanks of the J-bolts 38 and the other ends thereof are anchored in the bores 35'. Each assembly of a J-bolt 38 and an eye-lug 42 clamp cooperatively the terminal coils 37 and 41 against the base-plate 33 by each nut 39. The clamping is amplified by the terminal coils 41 themselves by turning the ends thereof to form lugs 43, which are anchored in bores 44 in the base-plate 33 to counteract torsional slippage of the coil springs 18 and 19. The rear ends of the coil springs 19 have corresponding enlarged terminal coils 45 provided with anchor lugs 46. One aligned pair of coil springs 18 and 19 may be eliminated and only one pair used as shown in Fig. 2.

Spaced apart rearwardly from the base-plate 33, is a rear plate 47 arranged vertically on edge and normally in parallel alignment with the base-plate 33.

The enlarged terminal coils 45 contact the forward side of the rear plate 47 and the anchor lugs 46 of the ends of the terminal coils 45 in the bores 48 of the plate 47. These enlarged terminal coils 45 are held by J-bolts 49 passing through bores 50 formed in the rear plate 47 and provided with nuts 51. The U-ends of the J-bolts 49 are anchored in bores in the plate 47.

The coil springs 18 are arranged in axial alignment with the rear coil springs 19. The small intermediate coils of the coil springs 18 and 19 preferably should bear against the baseplate 33 encircling the openings 34. The coil springs 19 may contain less carbon.

A flexible and tensionally adjustable connecting device 20 is disposed in each longitudinal pair of coil springs 18 and 19 extending through each opening 34. This device 20 may include a hollow plug 54 provided with an annular flange 55. Each plug 54 is carried in the forward end of each coil spring 18, the flange 55 abutting the spring 18. An eye-bolt 56 is mounted in the hollow of the plug 54 and another eye-bolt 57 in a bore in the rear plate 47, Fig. 2. An intermediate eye-rod 58 articulately connects the eye-bolts 56 and 57. An eye may be formed on the plate 47 or plug 54 to dispense one of the eye-bolts 56 or 57, therein. The tension of the device 20 is subject to limited adjustment by the said eye-bolts 56 or 57.

A stock 21 carrying a ground working implement 22 is connected to the rear plate 47. The stock 21 may be of spring material, when it should preferably be displaceable for replacement. If it be non-resilient, it may be integral with the plate 47 twisted immediately below the plate 47 at 90 degrees.

Figure 11:
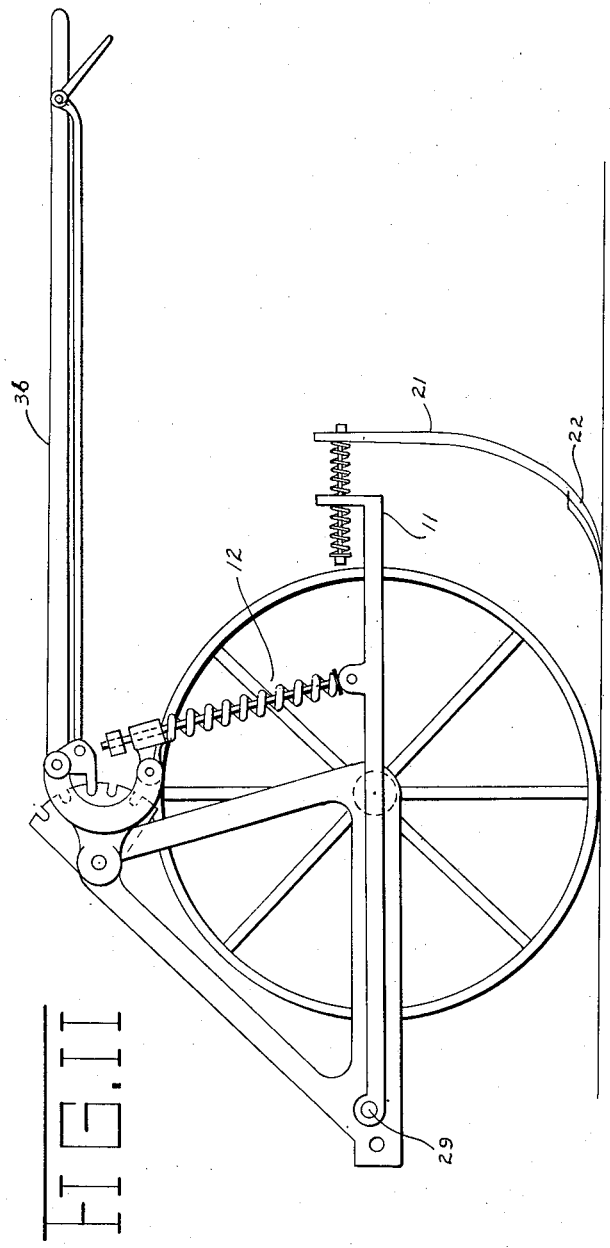
Figure 11 is a schematic view of the beam with the mounting as incorporated in the frame of a cultivator or a harrow.

Operation of the resilient mounting is as follows:

As illustrated in Fig. 11, the beams 11 and 13 are pivotally attached to the transverse bar or the like of a wheeled agricultural implement, which may be drawn over the ground by a tractor or the like. The beams 11 and 13 are supported in a generally horizontal position at a suitable elevation so that the ground engaging implements 22 properly enter the soil. The supporting means and the beams 11 and 13 embody resilient means 12, which permit of limited upward movement, against pressure, of the beams 11 and 13 to compensate for irregularities in the soil.

The ground engaging elements 22 work the soil and the forward and rear sets of springs 18 and 19 permit of the free movement or vibration of the stocks 21 and elements 22, longitudinally of the direction of travel of the mountings 10 as the same are drawn over the soil. This automatically frees the ground engaging implements 22 from debris, or other materials which might tend to attach thereto. When the ground engaging implements 22 engage a fixed obstruction, such as a stone, the length of the beams 11 and 13 and the pressure thereupon of the resilient means 12, regulated by a suitable lever means such as is indicated at 36, and the cooperative compressive, oscillatory and torsional flexibility of the springs 18 and 19 permit of the vertical and horizontal shifting of the attaching plate 47 and, even a limited lateral deflection of the implements 22, so that said implements 22 can readily ride over or laterally clear the stone or the like. The flexing of the connecting device 20 occurs at the connected eyes of said connecting device 20. The use of resilient stocks 21 amplifies yieldability and vibration of the mountings 10 and excessive lateral yieldability of the stocks 21 is better resisted, by using side by side, two pairs of the axially aligned coil springs 18 and 19.

It is to be understood that the form of my invention herewith shown and described is to be taken as a preferred example of the same and that various changes in the shape, size and arrangement of parts may be resorted to, without departing from the spirit of my invention or the scope of the subjoined claims.

Having thus described my invention, I claim:

1. A resilient mounting for a ground engaging implement, comprising a beam to be supported and moved axially over the ground, a forward attaching plate carried by the beam and extending transversely thereof beyond opposite sides of the beam, said attaching plate having openings arranged upon opposite sides of the beam, a rear attaching plate separate from the beam and extending transversely thereof beyond opposite sides of the beam and having openings arranged upon opposite sides of said beam, a ground engaging implement carried by the rear attaching plate at a point near the longitudinal center of the rear attaching plate, rods extending forwardly of the forward attaching plate and extending through said openings in said forward attaching plate to the rear of the forward attaching plate, coil springs surrounding the rods and arranged forwardly of the forward attaching plate and bearing against the same, means associated with the forward ends of the coil springs and of the rods, said means simultaneously resisting the pushing force of the springs and the pulling force of the rods, rear rods disposed between the forward and rear attaching plates and extending through the openings in the rear attaching plate and connected with the rear attaching plate, universal joints arranged between the attaching plates and connecting the forward and rear rods, coil springs surrounding the rear rods, and means to secure the rear ends of the forward springs and the forward ends of the rear springs to the forward attaching plate and the rear ends of the rear springs to the rear attaching plate, the arrangement being such so that the rear coil springs are expansible and upwardly flexible to permit under spring resistance rearward and lateral movement of the ground engaging implements.

2. A resilient mounting for a ground engaging implement, comprising a beam, a forward attaching plate secured to the beam and having openings arranged upon opposite sides of the beam, rods extending longitudinally of the beam and mounted within said openings and extending forwardly and rearwardly beyond said forward attaching plate, coil springs surrounding the rods to urge them forwardly and bearing against the forward side of the forward attaching plate, a rear attaching plate spaced from the forward attaching plate, rear rods connected with the rear attaching plate in substantial alignment with the forward rods and pivotally connected therewith, rear springs surrounding the rear rods and bearing against the forward and rear attaching plates, and a ground engaging implement carried by the rear attaching plate.

3. A resilient mounting for a ground engaging implement, comprising a beam, a forward attaching plate secured to the beam and having openings arranged upon opposite sides of the beam, rods extending longitudinally of the beam and mounted within said openings and extending forwardly and rearwardly beyond said attaching plate, resilient means disposed upon the forward side of the attaching plate for urging the rods forwardly, a rear attaching plate spaced from the forward attaching plate, rear rods connected with the rear attaching plate and disposed upon opopsite sides of said beam, coil springs disposed between the forward and rear attaching plates surrounding the forward and rear rods, pivot means connecting the forward and rear rods, and a ground engaging implement carried by the rear attaching plate.

4. A resilient mounting for a ground engaging implement, comprising a beam, a forward attaching plate secured to the beam and having an opening, a rod extending longitudinally of the beam and longitudinally movable in said opening and extending forwardly and rearwardly of the forward attaching plate, resilient means disposed forwardly of the forward attaching plate and connected with the rod to urge it forwardly, a rear rod, a rear attaching plate spaced from the forward attaching plate and connected with the rear rod, a coil spring arranged between the forward and rear attaching plates and surrounding said rods, pivot means connecting the rods and arranged within the rear coil spring and spaced from the forward and rear attaching plates, and a ground engaging implement carried by the rear attaching plate.

5. A resilient mounting for a ground engaging implement, comprising a beam, a forward attaching plate secured to the beam and having an opening, a coil spring arranged on the forward side of the forward attaching plate and having an enlarged terminal coil, means to clamp said enlarged terminal coil of the coil spring to the forward attaching plate, a rod disposed within the opening and extending rearwardly and forwardly of the forward attaching plate and communicating with the forward end of the coil spring, a rear attaching plate spaced from the forward attaching plate, a coil spring arranged between the forward and rear attaching plates and having forward and rear enlarged terminal coils, means to clamp the forward terminal coil to the forward attaching plate, means to attach the rear terminal coil to the rear attaching plate, a rear rod secured to the rear attaching plate, an articulate connection between the rods, and a ground engaging implement carried by the rear attaching plate.

6. The structure defined in claim 5 in which, the enlarged terminal coils are provided with lugs.

7. A resilient mounting comprising: a support; a front attaching plate secured to the support and having an opening; a front coil spring having one end thereof formed into an enlarged turn which bears against the front side of said front attaching plate, encircling the opening; a rear coil spring having each end thereof formed into an enlarged turn, one of which bears against the back side of said front attaching plate, encircling the opening; a connector consisting of articulately connected sections thereof, disposed in the opening of the said plate and in the coil springs; a stop member associated with the anterior end of the front coil spring, adapted to afford a base of resistance against the pressure of said coil spring and to be connected to the anterior end of the connector to resist the pulling force thereof; means to clamp the enlarged turns bearing against the sides of the said plate to said plate; a rear attaching plate articulately connected to the posterior end of the connector and bearing against the other enlarged turn of the rear coil spring; means to clamp the said enlarged turn of the rear coil spring to the rear attaching plate; and a stock, provided with a ground working implement, carried by said rear attaching plate.

8. The structure defined in claim 7 in which the enlarged turns of the coil springs are provided with lugs.

9. A resilient mounting for a ground engaging implement, comprising a beam, a forward attaching plate secured to the beam and having an opening, a rear attaching plate, a ground working implement connected to the rear attaching plate, a compressible coil spring connected to the forward side of the forward attaching plate, an expansible coil spring arranged between the forward and rear attaching plates, and a flexible connecting device extending through the opening in the forward attaching plate and through said coil springs and communicating with the rear attaching plate and with the forward end of the forward coil spring.

10. The structure defined in claim 9 and a bracket adjustably secured to the beam and carrying the forward attaching plate.

11. A resilient mounting for a ground engaging implement, comprising a beam, a forward attaching plate secured to the beam and having a pair of large openings formed therein, a rear attaching plate having a pair of openings formed therein, intermediate rods mounted within the large openings of the forward attaching plate, forward rods having universal connections with the intermediate rods, forward compressible coil springs surrounding the forward rods and the forward portions of the intermediate rods and bearing against the forward attaching plate, means connecting the forward ends of the forward coil springs with the forward rods, rear rods held within the openings of the rear attaching plate and having universal connections with the intermediate rods, expansible coil springs surrounding the rear rods and the rear portions of the intermediate rods and bearing against the forward and rear attaching plates, and a ground engaging implement carried by the rear attaching plate.

12. A resilient mounting for the ground working implement of a wheeled implement, comprising a beam; a combination of spring devices carried by the beam, one of said spring devices including a base-plate secured to the beam and having an opening; a rear plate spaced apart from said base-plate; a rear coil spring disposed between said plates and secured thereto; a forward coil spring secured to the forward side of the base-plate; a resistance member associated with the forward end of the forward coil spring, affording a base of resistance against the compression of said spring; a flexible connecting device extending through the opening in the base-plate and through the coil springs and connected to the rear plate and to the resistance member exerting a pulling force on said member; and another of said spring devices including a spring stock connected to the rear plate, and a ground working implement connected to the spring stock, said spring stock cooperating with the coil springs of the first mentioned spring device.

13. A resilient mounting for a ground working implement comprising a beam; a combination of spring devices carried by the beam, one of said spring devices including a base-plate secured to the beam and having a pair of openings; a rear plate spaced apart from said base-plate; a pair of rear coil springs disposed between said plates and secured thereto; a pair of forward coil springs secured to the forward side of the base-plate in alignment with the rear coil spring; a pair of resistance members associated with the forward ends of the forward coil springs, affording bases of resistance against the compression of said springs; a pair of flexible connecting devices extending through the pair of openings in the base-plate and through the aligned coil springs, and connected to the rear plate and to the pair of resistance members; said forward and rear coil springs, affording shock absorbers for the shocks emanating from the rear plate; and another of said spring devices including a spring stock connected to the rear plate, and a ground working implement connected to the spring stock.

14. The structure defined in claim 13, in which, the beam is provided with a plurality of the combination of spring devices carried by said beam.

15. A resilient mounting for a ground working implement, comprising a beam, a forward attaching plate secured to the beam and having a pair of openings, a rear attaching plate, a ground working implement connected to the rear attaching plate, a pair of compressible coil springs connected to the forward side of the forward attaching plate, a pair of expansible coil springs arranged between the forward and rear attaching plates, and a pair of flexible connecting devices each extending through one of the openings in the forward attaching plate and through one of the compressible and one of the expansible coil springs and communicating with the rear attaching plate and with the forward end of the forward coil springs.

16. The structure defined in claim 15 and a bracket adjustably secured to the beam and carrying the forward attaching plate.

17. In an agricultural ground working implement a series of beams; front transverse plates having opening means, secured to the beams; compressive coil spring means secured to the front sides of said transverse plates; oscillatory coil spring means secured to the back sides of the said plates; rear transverse plates secured to the oscillatory coil spring means; stop-plugs affixed to the free ends of the compressive coil spring means; connectors extending through the compressive coil spring means and the oscillatory coil spring means and through the opening means of said front plates and connected to the stop-plugs and to the rear plates; stocks connected to the rear plates, said stocks serving as ground working implements, and resilient means exerting downward pressure onto the beams.

18. The structure as defined in claim 17 and separate ground working implements secured to the stocks.

19. The structure as defined in claim 17, in which the stocks are of spring material.

20. In a wheeled ground working implement of a class wherein each of a plurality of laterally arranged beams is pivotally attached at the draw end thereof to a transversely extending draw member of the said implement, and wherein each of said beams is mechanically associated with means for raising and lowering each of said beams, said means including resilient pressure parts adapted for effecting downward pressure upon each of said beams to counteract the upward resistance of each of said beams when in operation, the combination with said resilient pressure parts of at least one resilient mounting carried by each beam, each of said mountings including a bracket secured to each of the beams and provided with an upright base-plate with opening means formed therein; compressive resilient means affixed to the fore side of said base-plate and oscillatory resilient means affixed to the rear side of said base-plate, said compressive and said oscillatory resilient means cooperating in resiliency with the resilient pressure parts of the raising and lowering means; a rear base-plate affixed to the oscillatory resilient means, said rear base-plate carrying a stock provided with a ground working implement; resistance means affixed to the compressive means; and means in articulate linkage with the resistance means and the rear base-plate.

21. The structure defined in claim 20 in which the stock provided with a ground working implement, is of resilient material and cooperating in resiliency with the resilient means of the bracket and the resilient pressure parts of the raising and lowering means.

References Cited in the file of this patent

UNITED STATES PATENTS

| | | |
|---|---|---|
| 404,845 | Kissell | June 11, 1889 |
| 503,288 | Moore | Aug. 15, 1893 |
| 1,348,255 | Versteeg | Aug. 3, 1920 |
| 1,656,838 | Smith | Jan. 17, 1928 |